July 13, 1926.
C. NELSON
END GATE
Filed August 4, 1923
1,592,742
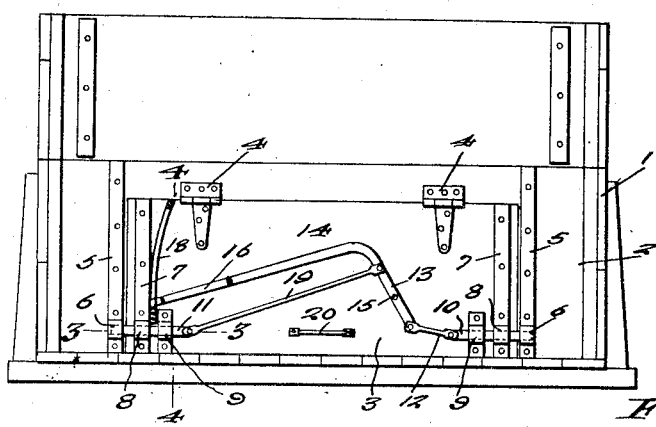
Fig.1.
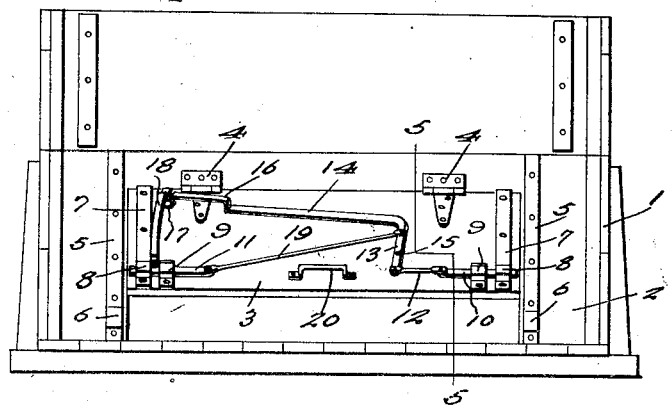
Fig.2.
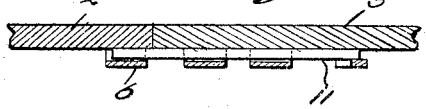
Fig.3.
Fig.4.
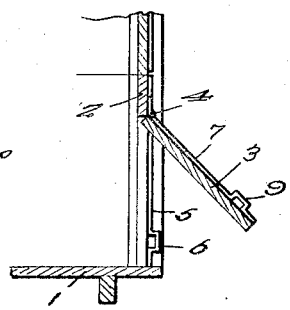
Fig.5.
Carl Nelson
INVENTOR
BY Victor J. Evans
ATTORNEY
WITNESSES Patented July 13, 1926.

1,592,742

UNITED STATES PATENT OFFICE.

CARL NELSON, OF EDGAR, NEBRASKA.

END GATE.

Application filed August 4, 1923. Serial No. 655,618.

This invention has reference to an end gate for grain wagons, and has for its primary object to provide a locking means for a hinged end gate which includes bolts slidably mounted on the gate to be received in keepers adjacent to the ends of the gate and operating mechanism for simultaneously sliding the bolts into or out of their keepers.

A further object is to produce a locking means for end gates for grain wagons or the like which will effectively hold the gates in closed position to prevent the escape of grain through the opening for the gate, and in which locking means for the gate of a novel construction is provided.

To the attainment of the foregoing and other objects which will present themselves as the nature of the invention is better understood, reference is to be had to the drawing which accompanies and which forms part of this application.

In the drawing:—

Figure 1 is a view looking toward the rear of a grain wagon provided with an end gate in accordance with this invention, the gate being closed.

Figure 2 is a similar view showing the gate partly open.

Figure 3 is a sectional view, on an enlarged scale and approximately on the line 3—3 of Figure 1.

Figure 4 is a similar sectional view approximately on the line 4—4 of Figure 1.

Figure 5 is a sectional view on the line 5—5 of Figure 2.

The rear portion of an ordinary grain wagon is indicated, in the drawing, by the numeral 1. The rear is closed by the usual boards 2. The lower board 2 is provided with a rectangular opening that enters from its lower edge. This opening is closed by a gate 3. The gate has its upper edge hinged, as at 4, to the board 2. The board 2, in a line with the end walls provided by the opening for the gate is reinforced by metal plates 5, and each of these plates at a suitable distance from its lower end may be rounded outwardly upon itself to provide a bolt keeper, or brackets may be secured to the plates to provide these keepers. The keepers are indicated by the numeral 6.

The outer face of the gate 3, adjacent to its ends is reinforced by metal plates 7, each of said plates being bent upon itself to provide or having secured thereon a guide 8 for the sliding bolts which will presently be described. In addition to the guides 8, other guides 9 are secured inwardly of the plates 7.

Arranged for slidable movement through the aligning guides 8 and 9 there are bolts 10 and 11 respectively. The inner end of the bolt 10 has pivotally secured thereto a link 12, the said link in turn being pivotally secured to the inner arm 13 of an angle lever. The upper arm of the angle lever is indicated by the numeral 14. The arm 13 of the lever is pivoted, as at 15, to the end gate.

The upper or outer arm 14 of the angle lever is bent upon itself adjacent its ends to provide a substantially U-shaped handle portion 16, but is formed with a straight extension from the said handle, and this extension, indicated by the numeral 17, is received in an arched guide 18 that has its ends secured to the end gate. Preferably the extension 17, which is in the nature of a finger exerts a spring tension against the guide 18 to sustain the lever in swung position to hold the bolts when thrown or when in release position. If desired, however, the guide may be provided with lugs for engagement with the said extension or finger.

Pivotally secured to the inner end of the bolt 11 there is a comparatively long link or rod 19 which has its free end pivoted to the arm 13 of the angle lever adjacent to the juncture of the arm 14 with the said arm 13.

Preferably there is centrally secured on the end gate, adjacent to the lower edge thereof, a handle 20.

By grasping the handle 16 on the upper arm of the angle lever and swinging the same on its pivotal connection with the end gate the bars or links connected between the said angle lever and the bolts will move the latter to locking position, when the end gate is closed or to release position, and the engagement between the finger 17 and the guide 18 will, as previously stated, hold the lever when swung to either of such positions.

The improvement is comparatively simple, may be cheaply manufactured and arranged upon any ordinary construction of end gates, and it is thought that the above description, when taken in connection with the drawing will amply set forth the advantages of the improvement to those skilled in the art to which the same relates.

Having described the invention, I claim:—

The combination with a grain wagon having its rear board provided with an opening, and an end gate received in and having its upper edge hingedly secured to the said board, said board having reinforcing straps in a line with the opposed walls provided by the opening and said straps having keepers, bolts slidably mounted on the end gate to engage in the keepers, links pivotally secured to the inner ends of the bolts, an angle lever having one of its arms pivoted to the end gate and said links being pivotally secured to said arm at points approximately equi-distant from its pivot, the second arm of the angle lever being offset to provide a handle and a finger projection, a guide on the end gate in which the finger is received, there being a contacting engagement between the finger and guide to prevent the free swinging of the lever and to hold the bolts either in thrown or retracted position.

In testimony whereof I affix my signature.

CARL NELSON.